(No Model.) 8 Sheets—Sheet 1.

C. T. CAYLEY & R. S. COURTMAN.
MANUFACTURE OF SHELLS.

No. 374,113. Patented Nov. 29, 1887.

Witnesses
Geo. W. Rea
Robert Everett

Inventors
Claud T. Cayley
Reuben S. Courtman
By James L. Norris, Atty.

(No Model.) 8 Sheets—Sheet 3.
C. T. CAYLEY & R. S. COURTMAN.
MANUFACTURE OF SHELLS.
No. 374,113. Patented Nov. 29, 1887.

Witnesses.
Geo. W. Rea.
Robert Pruett.

Inventors
Claud T. Cayley
Reuben S. Courtman
By James L. Norris.
Atty.

(No Model.) 8 Sheets—Sheet 4.

C. T. CAYLEY & R. S. COURTMAN.
MANUFACTURE OF SHELLS.

No. 374,113. Patented Nov. 29, 1887.

Witnesses.
Geo. H. Rea.
Robert Everett.

Inventors
Claud T. Cayley
Reuben S. Courtman
By James L. Norris
Atty.

(No Model.) 8 Sheets—Sheet 5.
C. T. CAYLEY & R. S. COURTMAN.
MANUFACTURE OF SHELLS.

No. 374,113. Patented Nov. 29, 1887.

(No Model.) 8 Sheets—Sheet 6.

C. T. CAYLEY & R. S. COURTMAN.
MANUFACTURE OF SHELLS.

No. 374,113. Patented Nov. 29, 1887.

Witnesses.
Geo. W. Rea,
Robert Everett.

Inventors
Claud T. Cayley.
Reuben S. Courtman
By James L. Norris
Atty.

(No Model.) 8 Sheets—Sheet 8.

C. T. CAYLEY & R. S. COURTMAN.
MANUFACTURE OF SHELLS.

No. 374,113. Patented Nov. 29, 1887.

Fig. 23.

UNITED STATES PATENT OFFICE.

CLAUD THORNTON CAYLEY AND REUBEN SAMUEL COURTMAN, OF LONDON, ENGLAND; SAID COURTMAN ASSIGNOR TO SAID CAYLEY.

MANUFACTURE OF SHELLS.

SPECIFICATION forming part of Letters Patent No. 374,113, dated November 29, 1887.

Application filed February 12, 1887. Serial No. 227,419. (No model.) Patented in England December 24, 1886, No. 16,943.

*To all whom it may concern:*

Be it known that we, CLAUD THORNTON CAYLEY and REUBEN SAMUEL COURTMAN, subjects of the Queen of Great Britain, and both residents of London, England, have invented new and useful Improvements in and relating to the Manufacture of Projectiles or Shells and other Forged Metal Articles, (for which we have applied for provisional protection in Great Britain, No. 16,943, bearing date December 24, 1886,) of which the following is a specification, reference being had to the accompanying drawings.

Our invention is chiefly designed to provide for the manufacture, in a simple, efficient, and advantageous manner, of hollow projectiles or shells for guns of large or small caliber. Our improvements are, however, applicable for the manufacture of breech-screws or breech-plugs for ordnance, and of other articles which are partially hollow or tubular.

Our said invention comprises an improved method of manufacturing a hollow projectile or shell from a solid block or piece of steel or iron by driving a series of punches or mandrels successively into the said block while the latter is held or supported in a die or mold, as hereinafter described, and thus causing the metal of the block to flow endwise around each punch or mandrel, so that a chamber or cavity of the desired dimensions is gradually formed within the block.

It also comprises various other improvements, as hereinafter set forth.

In the accompanying drawings, Figures 1 and 1ª are side elevations showing different forms of solid blocks, such as we use in making hollow armor-piercing projectiles in accordance with our said invention.

Figure 1:
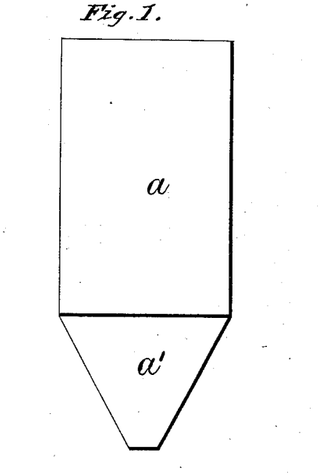
Figure 1A:
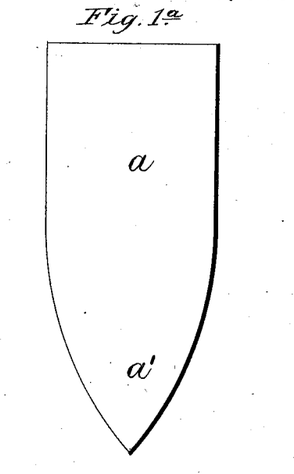
Figure 2:
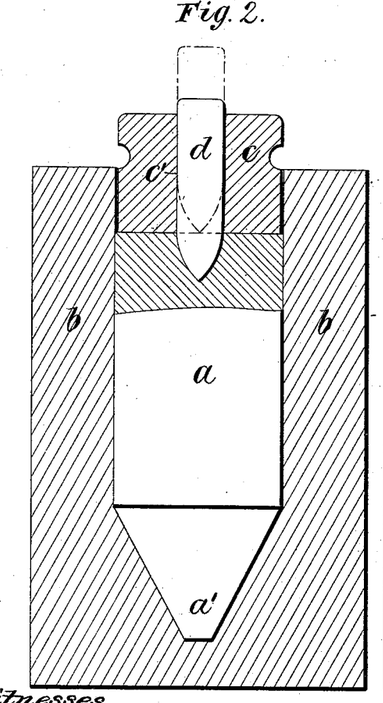
Figs. 2 and 2ª are sectional elevations showing the said blocks supported in dies, as hereinafter described, and illustrating the first step or stage in the formation of the chambers or cavities in the said blocks.
Figure 2A:
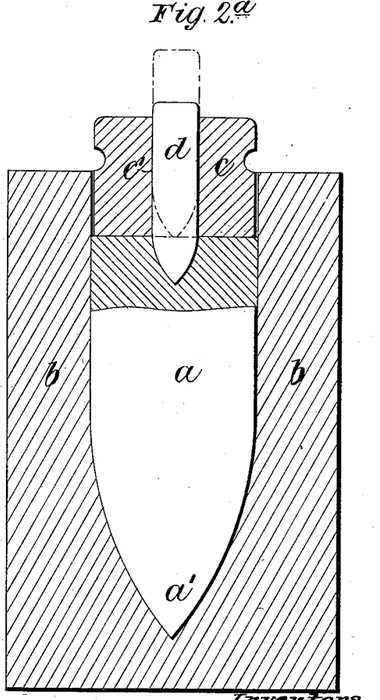
Figure 3:
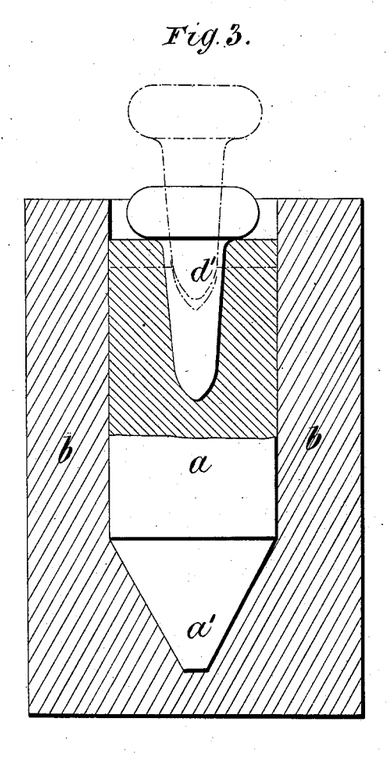
Figs. 3, 4, 5, 6, 7, and 8 are sectional elevations illustrating different steps or stages in the manufacture of a hollow projectile from a block of the form shown in Figs. 1 and 2.
Figure 4:
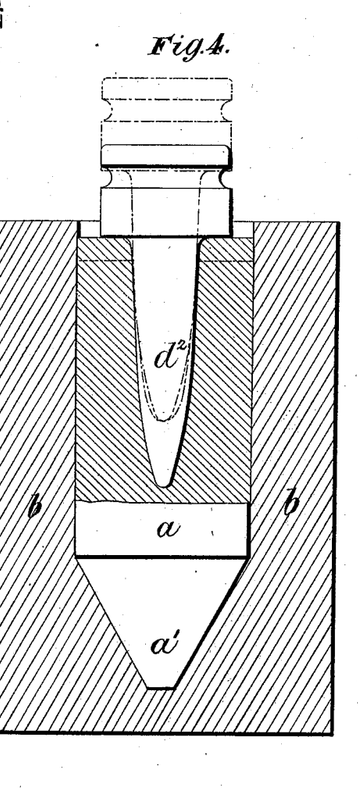
Figure 5:
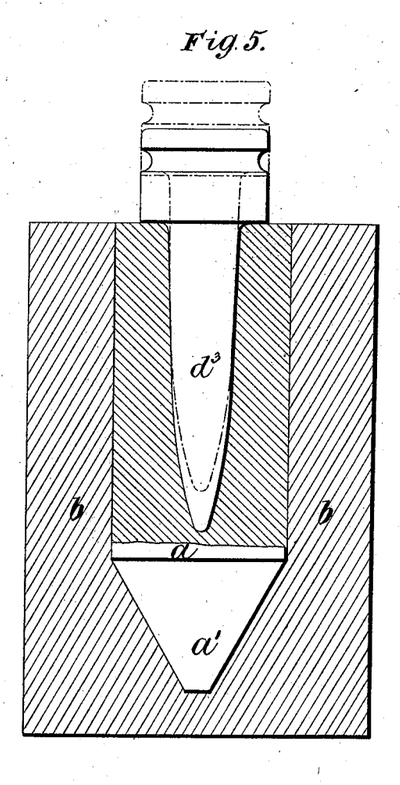

In making an armor-piercing projectile we take a solid cylindrical block, $a$, Fig. 1 or 1ª, having a conical or conoidal end, $a'$. This block may be formed by forging, rolling, or otherwise working an ingot or bar of steel or iron. The said block is made of the same or nearly the same diameter as the finished projectile, as its diameter is not or need not be altered by the operations to which it is subjected in the practice of our invention. Therefore the die will be bored to a diameter the same or nearly the same as the finished projectile. We prefer, however, that allowance should be made for turning and grinding or finishing the projectile after it is forged. The block must be shorter than the finished projectile, as will hereinafter appear. The proper length of the block can be determined by the weight thereof. We heat the said block and place the same in a die or mold, $b$, preferably in a vertical position, with its conical end downward, as shown. This die or mold is of such internal form and diameter that the said block will fit therein with sufficient accuracy to prevent its deformation when subjected to the treatment hereinafter described. The said die or mold is of such length that when the block is placed therein the walls of the said die or mold will extend a short distance above the upper end of the block, as shown in Figs. 2 or 2ª. We place in the said die or mold, above the block $a$, a metal disk or cylinder, $c$, having a central hole, $c'$. In this hole we insert a punch or mandrel, $d$, which we drive into the said block by means of a hammer or by pressure, thus forming a hole or cavity in the center of the upper end of the block and providing a central entrance for other punches or mandrels, hereinafter referred to. We then remove the disk or cylinder $c$, together with the punch $d$, from the die or mold $b$, and by hammering or by pressure we drive a series of punches or mandrels, $d'$ $d^2$ $d^3$, successively, into the said hole or cavity in the said block, using in each operation a punch or mandrel of greater length than that used in the preceding operation, as shown in Figs. 3, 4, and 5, the said block being reheated as often as may be required. The driving or forcing of each succeeding punch or mandrel farther into the block causes the metal displaced by the said punch or mandrel to rise or flow endwise around the same, so that the walls of the projectile are formed partly by the driving of the punch farther into the block and partly by such endwise flow or movement of the metal. By these successive operations we gradually form a chamber or cavity within the block of the desired size and shape or configuration, and thus convert the solid block into a partially-finished hollow projectile.

Figure 6:
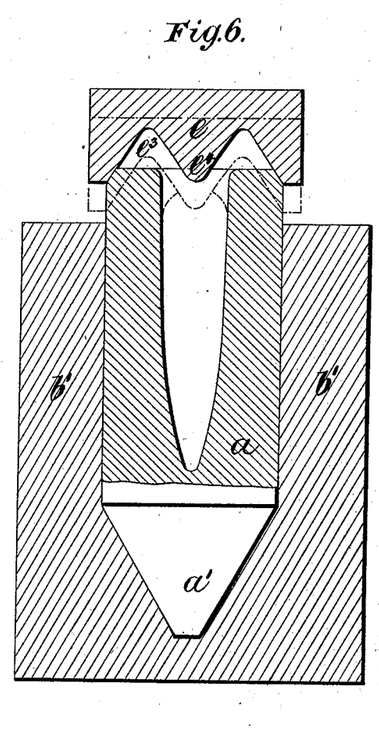
Figure 7:
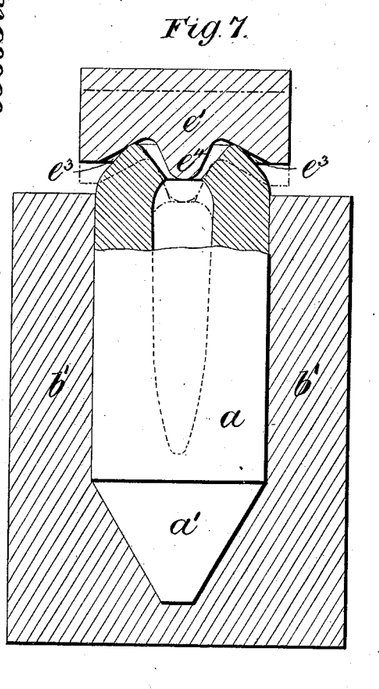
Figure 8:
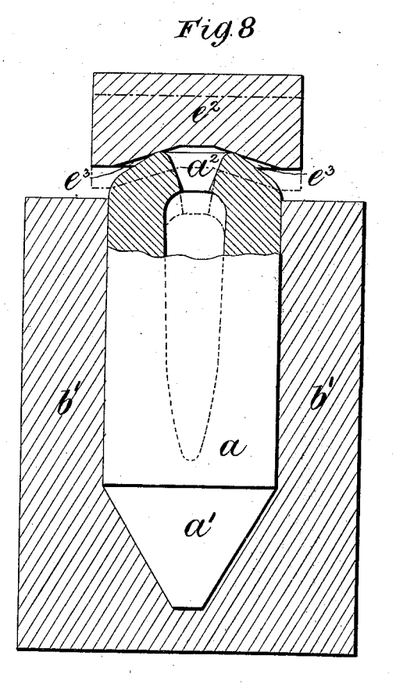
Figure 9:
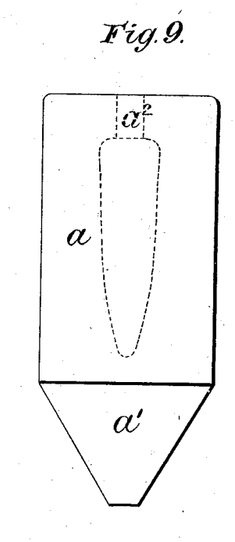
Fig. 9 is a side elevation of the said projectile previous to the turning and finishing thereof.

For the purpose of closing the open base of this partially-made projectile, we heat the base thereof, taking care to avoid heating the remainder of the projectile, and we place the said projectile in a supporting die or mold, $b'$, Figs. 6, 7, and 8. This die or mold is similar to that above described, but is shorter than the projectile, so that the open end of the latter projects above the top of the die or mold, as shown. We then place successively upon the open end of the projectile a series of dies, $e$ $e'$ $e^2$, which, by hammering or by pressure, are caused to gradually close the base of the said projectile, leaving a small central hole, $a^2$, which is afterward closed by inserting a screw-plug, or otherwise. The die $e$, which we first used in thus closing the base of the projectile, is made with a conical recess or cavity, $e^3$, which fits over the base of the projectile, and with a central projection, $e^4$, within the said cavity. In the other dies, $e'$ $e^2$, which we use for this purpose the recesses or cavities $e^3$ are shallower than that in the first die, the cavity in the die $e^2$ being shallower than that in the die $e'$. The die $e'$ is shown with a central projection, $e^4$, and the die $e^2$ is shown without a central projection. All or any of these dies may, however, be made either with or without such central projections. After the walls of the projectile at the base thereof have been turned over or bent inward by means of the said dies, the projectile is subjected to the action of a hammer or other suitable tool to complete the closing of its open end with the exception of the hole $a^2$.

From the foregoing description it will be seen that we make a hollow armor-piercing projectile from a solid block having the same or approximately the same shape or configuration as the finished projectile. In this manner we can manufacture very large and heavy shells or projectiles without the necessity for using boring-tools in the formation of the chambers or cavities within the same. Moreover, we can by the same process take solid finished projectiles and convert the same into hollow projectiles.

It is obvious that in making a projectile in the manner above described the repeated action of the punches upon the metal of the block will improve the quality of the steel and make the point or head of the projectile very dense and hard, thereby insuring the penetration by the said projectile of very heavy or thick armor-plates against which it may be fired. Moreover, the tenacity of the walls of the projectile will be increased by the working of the metal in the manner above specified.

In some instances before closing the open end of the partially-made projectile we insert a mandrel in the chamber or cavity thereof, and place the said projectile with the mandrel therein in a lathe and turn the said projectile or shell to approximately the finished dimensions. We then remove it from the lathe and close its open end, and then again place it in a lathe to finish its exterior. We thus insure uniformity in the thickness of the walls by turning the projectile true to its central chamber or cavity.

Figure 10:
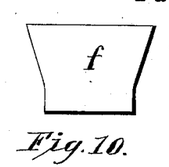
Fig. 10 is a side elevation of a solid block of steel or iron, such as we prefer to use in making a shrapnel shell according to our said invention.

In making a shrapnel shell according to our said invention we take a block, $f$, Fig. 10, which may be formed by forging, rolling, or otherwise working an ingot or bar of steel or iron. The lower end of this block is of the same or approximately the same diameter as the base of the finished shell. The upper part of the said block has the form of an inverted truncated cone. We heat this block and place it in a die or mold, $b^2$, of such internal form and dimensions that the said block will fit therein with sufficient accuracy to prevent its deformation when subjected to the action of the punch or mandrel. We also place in the said die or mold, above the block, a metal cylinder, $c^2$, having a central hole, $c^3$, in which we insert a punch or mandrel, $d^4$, for forming a central hole or cavity in the upper end of the block, as above described. We then work the said block successively in a series of dies, such as those shown at $b^3$ $b^4$, Figs. 12 and 13, substantially in the manner above described, by means of punches or mandrels, such as those shown at $d^5$ $d^6$ in the said figures. We thus form within the said block a conical chamber or cavity and produce a partially-made shell. We then force this partially-made shell through a die, or successively through two or more dies—such as that shown at $b^5$ in Fig. 14—by pressure or by impact by means of a mandrel, $d^7$, corresponding in shape and diameter with the chamber or cavity of the finished shell, for the purpose of forcing the walls of the shell inward and making the same parallel. Each of the punches or mandrels $d^5$ $d^6$ $d^7$ is made with a projection, $d^8$, at its lower end for the purpose of gradually forming in the projectile the chamber for the bursting charge.

Figure 11:
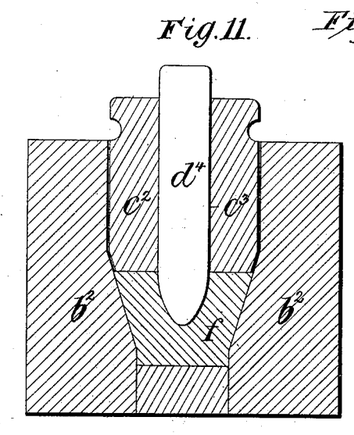
Figs. 11, 12, 13, and 14 are vertical central sections illustrating different steps or stages in the manufacture of a shrapnel shell according to our invention, the punches or mandrels being shown in elevation.
Figure 12:
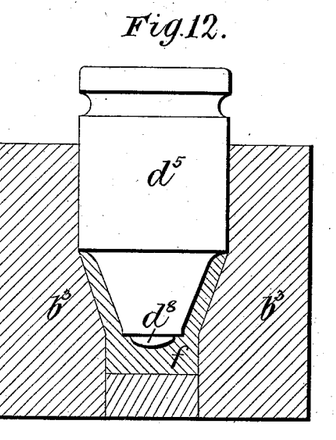
Figure 13:
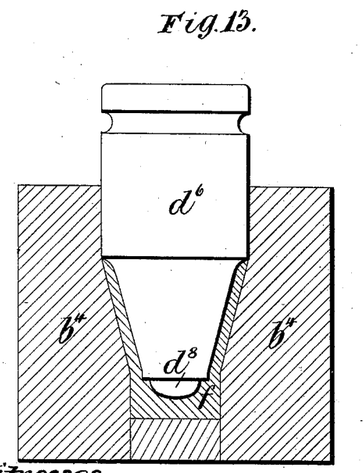

In making a common shell according to our said invention we proceed in a similar manner to that above described with reference to the shrapnel shell, using punches or mandrels such as those shown in Figs. 11, 12, and 13, but without the projections at the lower ends thereof, the said punches or mandrels being of the shape or configuration which it is desired to impart to the chamber or cavity of the finished shell. We thus produce a partially-made shell having the conical form shown in Fig. 15. We then force the said shell through the die $b^6$ by means of a punch or mandrel $d^9$, and thus force the walls inward and make them parallel, so that the shell has the form shown in Fig. 16.

Figure 15:
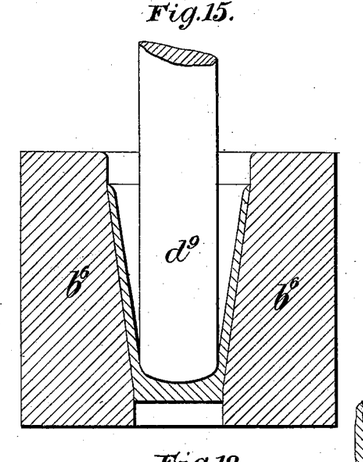
Figs. 15 and 16 are vertical central sections illustrating different steps or stages in the manufacture of a common shell according to our invention.
Figure 16:
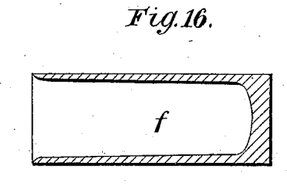

We sometimes employ other means than those above described for forcing inward the walls of a partially-made shell having the conical form shown in Fig. 15, and thus making the said walls parallel. For instance, we accomplish this result by rolling the said shell between smooth platens or suitably-shaped dies, which are subjected to pressure and to which reciprocating motion is imparted, so that the said platens or dies move in opposite directions, or by rolling the said shell between suitable rotating rollers. We prefer to insert a mandrel in the said shell during the rolling operation, to insure the proper shaping of the chamber or cavity in the shell, and also to insure uniformity in the thickness of the walls thereof. In other instances we accomplish the desired result by swaging the partially-made shell between suitably-shaped dies, which act thereon in directions at right angles to its axis.

Figure 17:
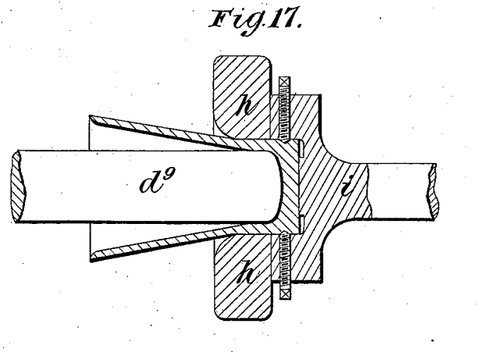
Figs. 17 and 18 are longitudinal central sections illustrating a novel method of drawing or forcing a partially-made projectile or shell through a die to make its walls parallel or to reduce the thickness thereof.
Figure 18:
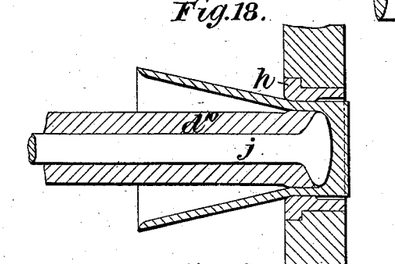

In some instances we force the base only of the partially-made shell through a die, $h$, Fig. 17, by means of a mandrel, $d^9$, and then clamp the said base in the end of a bar or rod, $i$, which is operated by hydraulic or other power to draw the said shell completely through the die, while the mandrel is held stationary in the position shown in Fig. 17; or we employ a tubular mandrel, $d^{10}$, and a ram or piston, $j$, fitted to slide longitudinally therein, as shown in Fig. 18. In this case the partially-made shell is placed upon the said mandrel and ram or piston, which are then moved by hydraulic or other power into the position shown in this figure, so that the part of the mandrel of largest diameter is opposite or within the part of the die of smallest diameter. The mandrel is then held stationary, while the ram or piston continues its movement and forces the shell through the die $h$. By this novel method of drawing or forcing a projectile or shell through a die while the mandrel is held stationary we provide for making the inner surfaces of the walls of the projectile or shell parallel, and insuring uniformity in the thickness thereof, and at the same time strip the projectile off the mandrel. We thus obviate the disadvantages arising from the use of a taper mandrel, as in some of the methods heretofore practiced, which necessitates the formation of a taper chamber or cavity within the projectile or shell. The method and apparatus described with reference to Figs. 17 and 18 are, moreover, applicable for drawing partially-made projectiles or shells for the purpose of reducing the thickness of their walls, whether the said projectiles or shells previous to such reduction are of conical or cylindrical form. We may, however, employ any other suitable method or manner of making the walls parallel.

Figure 14:
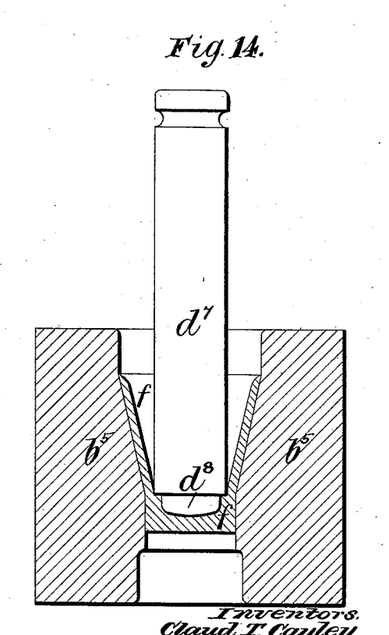
Figure 19:
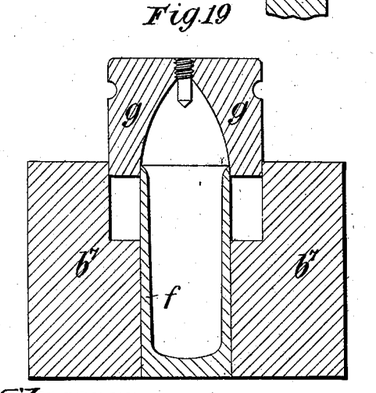
Figs. 19 and 20 are vertical central sections illustrating a method or manner of closing the open end of a partially-made shell.
Figure 20:
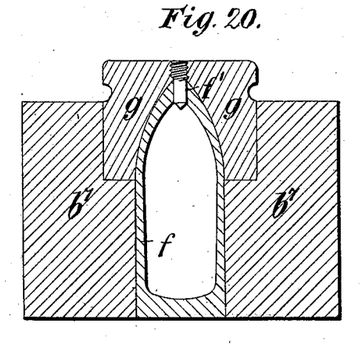
Figure 21:
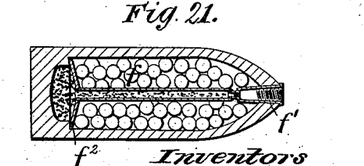
Fig. 21 is a longitudinal central section of an improved shrapnel shell, hereinafter described.

To close the open end of the partially-made shell and form the conoidal point or apex, we heat this end of the shell and insert the said shell in a die or mold, $b^7$, Figs. 19 and 20, whereby it will be supported in such a manner as to prevent its deformation. We then place over the open end of the shell a die, $g$, which we drive or force downward upon the shell by pressure or by impact, so that the walls at this end of the said shell are gradually bent or forced inward, leaving an aperture, $f'$, at the apex for the fuse. The open end only of the partially-made shell must be heated, the remainder being left as cool as possible to prevent upsetting of the walls. The shrapnel shell shown in Fig. 14 is designed to have a conical or conoidal end secured thereto by rivets or otherwise in a well-known manner. In Fig. 21, however, we have shown a forged shrapnel shell which is formed from a single piece of steel in accordance with our invention, the open end of the said shell being closed in the manner above described with reference to Figs. 19 and 20. In making a shrapnel shell in this manner we can insert the diaphragm $f^2$, which covers the chamber for the bursting charge, before closing the end of the partially-made shell, as above described.

We make the aperture $f'$ at the apex of the shell large enough to permit the introduction of the bullets or shot into the said shell after its end has been closed with the exception of the said apertures. We prefer to fill the conical or conoidal part as well as the cylindrical part of the chamber or cavity in the shell. We then introduce the bursting charge and insert the fuse. We thus produce a forged shrapnel shell containing a larger number of bullets than a forged shrapnel shell of the same dimensions as heretofore manufactured, and we are enabled, if desired, to use steel instead of lead bullets, the larger quantity employed making up for the difference in the weight of the two metals. Moreover, we can by our improved method manufacture shrapnel shells more cheaply than is practicable by the well-known method of making them in two parts and uniting the said parts by riveting, screwing, or otherwise.

Figure 22:
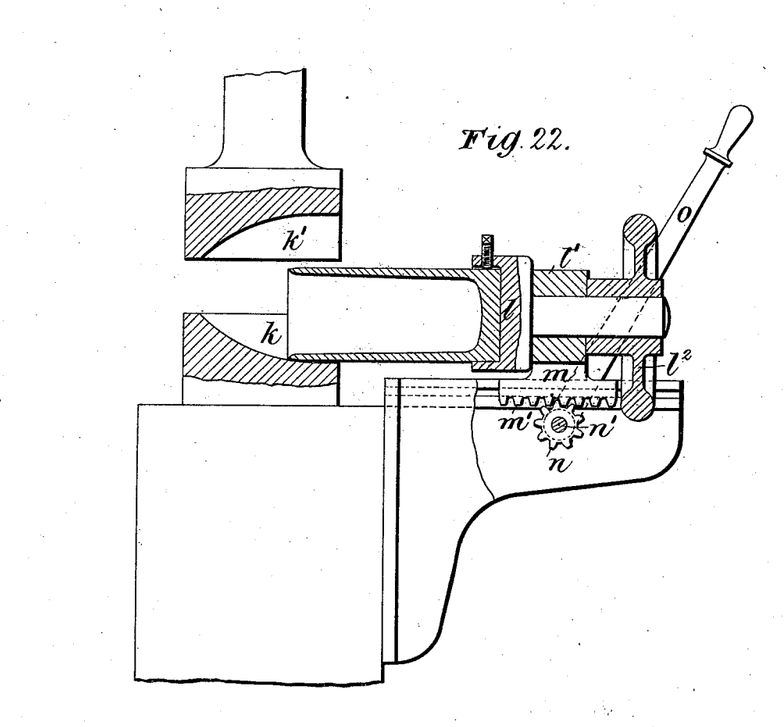
Fig. 22 is a sectional elevation illustrating another method or manner of closing the open end of a partially-made shell.

We sometimes close the open end of the partially-made projectile or shell by swaging the same between dies, such as those shown at $k\ k'$ in Fig. 22, which dies act upon the said projectile or shell in directions at right angles to its axis. The partially-made shell is clamped in a holder, $l$, fitted with a capability of rotation in a bearing, $l'$, and provided with a hand-wheel, $l^2$, whereby it may be turned in either direction, as desired. The bearing $l'$ is formed in a block, $m$, fitted to slide in suitable guides and provided with a rack, $m'$, with which gears a pinion, $n$. This pinion is fixed upon a shaft, $n'$, on which is also fixed a lever, $o$, whereby the said shell may be moved forward as the end of the said shell is gradually closed by the dies $k\ k'$. We may, however, employ other suitable means for closing the open ends of the partially-made projectiles or shells.

Breech-screws or breech-plugs for ordnance have generally been made hollow by boring out the solid metal.

In making a breech-screw or breech-plug according to our invention we first form a metal block of suitable shape by forging, rolling, or otherwise, and we heat this block and place the same in a supporting die or mold and form a chamber or cavity within the said block by means of punches or mandrels, substantially in the manner hereinbefore set forth. If desired, we close the open end of the said block by means of a screw-plug or otherwise. We then finish the exterior of the block and form the screw-threads thereon, thus producing a finished breech-screw.

It is obvious that in practicing our invention we may use any desired number of dies or of punches or mandrels, and that the shape or configuration and dimensions of the said dies and of the punches or mandrels must be varied according to the desired size and shape or configuration of the projectile and other circumstances. In some instances the central chamber or cavity of the hollow article may be formed by driving or forcing a single punch or mandrel into one end of the block, the said block being reheated as often as may be required. The cavity in the die or mold should be of the same or approximately the same diameter and shape or configuration as the exterior of the finished projectile or shell. The block is preferably of such diameter that it will accurately fit the die or mold, so that although the block is increased in length by the endwise flow or expansion of the metal, yet its diameter will remain unchanged throughout the operations necessary in forming the chamber or cavity within it.

Figure 23:
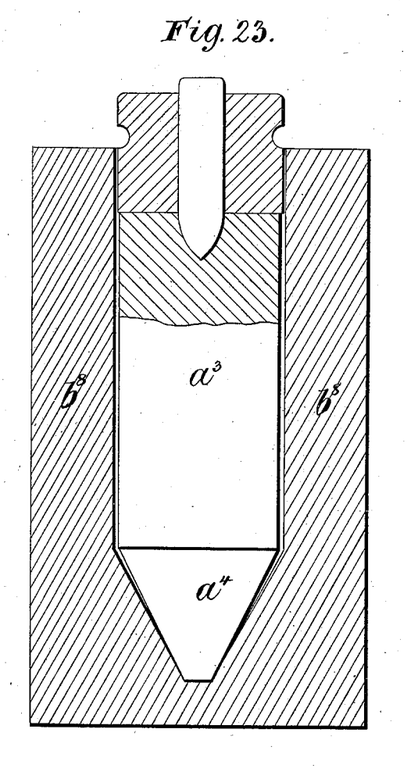
Fig. 23 is a sectional elevation illustrating a modification of our invention.

According to the modification of our invention illustrated in Fig. 23, we take a die, $b^8$, the chamber or cavity in which is of the same or approximately the same diameter as the finished projectile. We place in this die a block, $a^3$, of less diameter than the cavity in the die, and we operate upon the said block by means of punches or mandrels substantially in the manner above described, thereby forming the chamber or cavity in the block, and causing the metal displaced from its center to flow or move radially outward until the said block accurately fits the die. In this case there will be no endwise flow or expansion of the metal, such as that hereinbefore referred to, unless the block is of such diameter that by its radial expansion it will accurately fit the die before the formation of the chamber or cavity within it is completed.

The blocks which we use may be advantageously made from cogged or hammered ingots of steel or iron for projectiles of large size. For projectiles of small size the said blocks may be advantageously produced from a rolled bar by the method or process described in the specification of British Letters Patent granted to G. F. Simonds, and dated June 9, A. D. 1885, No. 7,028.

We sometimes form, in the manner above described, a chamber or cavity of the required size and shape or configuration in a cylindrical block of metal, and then impart the desired external form or configuration to the said block by the method of rolling between dies described in the said specification of G. F. Simonds and in the specification of British Letters Patent granted to him, and dated January 9, A. D. 1886, No. 396.

We are aware of the methods or processes of manufacturing hollow projectiles or shells described by M. Delmard in the specifications of British Letters Patent granted to him, and dated January 31, A. D. 1884, No. 2,466, and November 25, A, D. 1885, No. 14,480, and by J. Baldie in the specification of British Letters Patent granted to him, and dated February 9, A. D. 1884, No. 3,047. Each of these methods, however, is based upon the principle of gradually working a metal disk into the required shape, which is a comparatively tedious and expensive operation, and in the case of heavy armor-piercing projectiles with thick walls is impracticable.

By making a hollow projectile or shell from a solid block, as hereinbefore described, we are enabled to produce hollow projectiles more cheaply and to use steel of harder nature than when a disk is employed.

Having now particularly described and ascertained the nature of our said invention and in what manner the same is to be performed, we wish it understood that we make no claim to the methods or processes already claimed in the aforesaid specifications; but

We claim—

1. In the manufacture of a hollow projectile or shell from a solid block of metal, the method herein described of forming the central chamber or cavity, which consists in driving a series of different-sized punches or mandrels successively into one end of the said block while it is supported in a die or mold.

2. In the manufacture of a hollow projectile or shell from a solid block or piece of metal, the formation of the central chamber or cavity by driving punches or mandrels of different sizes successively into one end of the said block while it is supported in a die or mold, which prevents enlargement of its diameter while allowing the metal to flow endwise, for the purpose above specified.

3. In the manufacture of a hollow projectile or shell from a solid block or piece of metal, the formation of the central chamber or cavity by driving punches or mandrels of different sizes successively into one end of the said block while it is supported in a die or mold the cavity of which is larger in diameter than the said block, so that the metal displaced from the center of the block will flow radially outward until the said block accurately fits the said die or mold.

4. The improved method of manufacturing a hollow projectile or shell or similar forged-metal article, consisting in driving or forcing a series of punches or mandrels successively into one end of a solid block of metal while it is supported in a die or mold of such internal diameter that the metal displaced from the center of the block must flow or expand endwise, and, if necessary, drawing or forcing the said block through one or more dies, and then closing or partially closing the open end of the hollow block thus produced and turning or otherwise finishing the said block, substantially as set forth.

5. The improved method of manufacturing a forged shrapnel shell, consisting in first forming a hollow cylindrical body from a single solid block or piece of metal, inserting the diaphragm therein, and closing or partially closing the open end thereof, substantially as hereinbefore described.

6. The method herein described of making a hollow projectile or shell, which consists in converting a solid metal block into a cup by displacing the metal from the center of the block, while preventing enlargement of its diameter to force the metal to flow endwise of the block, and subsequently compressing the open end of the cupped block to close or partially close the said end, substantially as set forth.

7. The method herein described of making a hollow shell or projectile, which consists in driving a series of punches or mandrels of different sizes successively into one end of the block while held in a die or mold, and subsequently compressing the base end of the block to close the open end thereof, substantially as set forth.

8. The combination, with a die, of a tubular mandrel and a ram or piston fitted to slide longitudinally within the said mandrel, substantially as and for the purposes set forth.

In testimony whereof we have hereunto signed our names in the presence of two subscribing witnesses.

CLAUD THORNTON CAYLEY.
REUBEN SAMUEL COURTMAN.

Witnesses:
DAVID YOUNG,
C. JUNGE.